April 25, 1961 E. R. ORSATTI ET AL 2,981,827
LIGHT-REFLECTING LENS
Filed Dec. 24, 1956 2 Sheets-Sheet 1
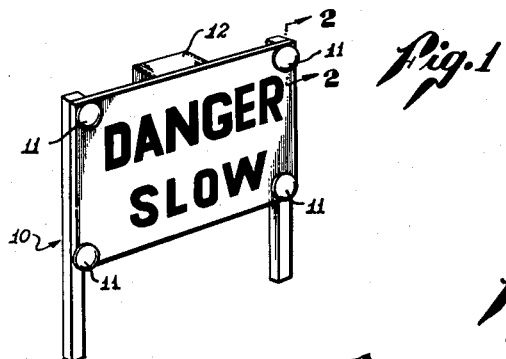
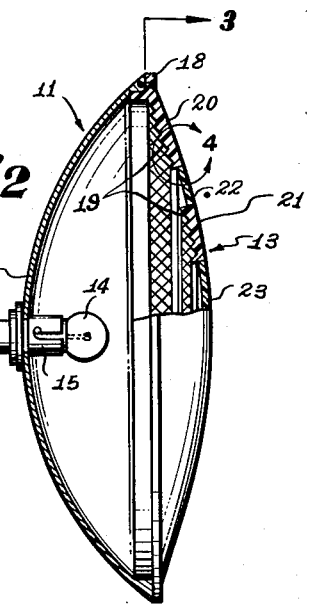
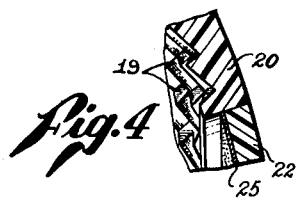
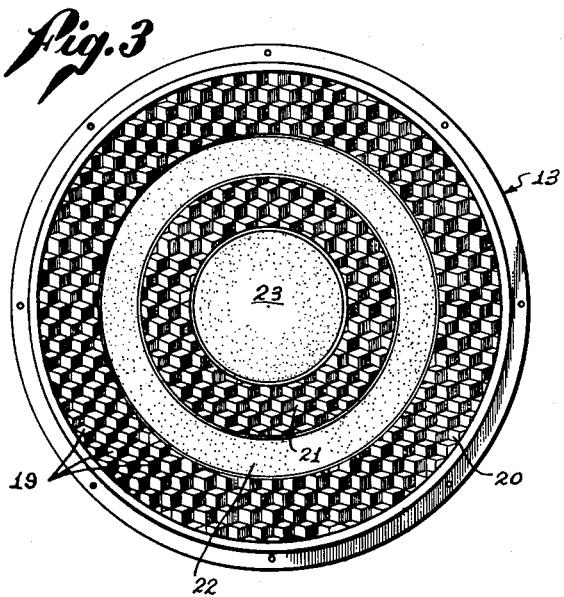
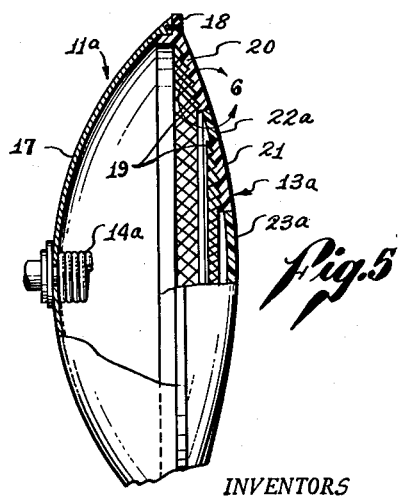
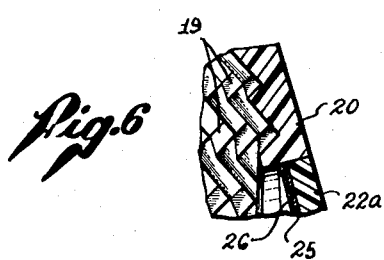
INVENTORS
ERNEST R. ORSATTI
LEE W. HOGGAN
BY
Attorneys

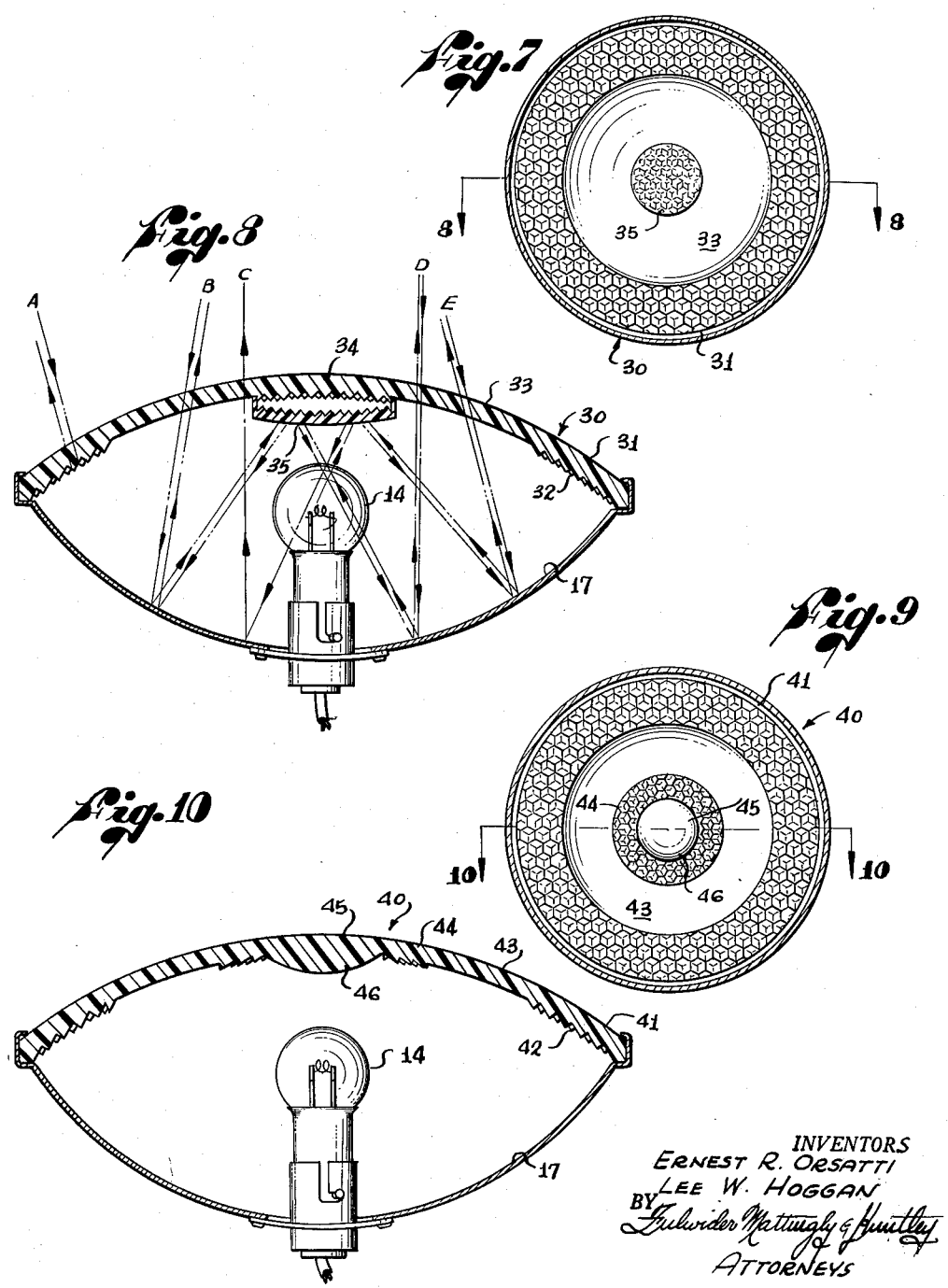

United States Patent Office 2,981,827
Patented Apr. 25, 1961

2,981,827
LIGHT-REFLECTING LENS
Ernest R. Orsatti, 5238 Canoga Park Ave., Woodland Hills, Calif., and Lee W. Hoggan, 3829 Pomeroy St., Los Angeles, Calif.
Filed Dec. 24, 1956, Ser. No. 630,303
8 Claims. (Cl. 240—2.25)

This invention relates generally to light-transmissive and refractive lenses having light-reflective characteristics. Such lenses are particularly useful in warning and indicating lights that normally are continuously or intermittently illuminated, but which should act at least as a reflector in the event that the normal light source fails. The present application relates to lenses of the general type shown in the co-pending application of Ernest R. Orsatti, one of the inventors herein, now Patent No. 2,798,147 issued July 2, 1957, and entitled "Light-Reflecting Lens."

On construction projects where barricades or other obstructions must be placed, it has long been the practice to locate flares or other illuminated warning devices near the barricades so that motorists and even pedestrians will be warned of the potential danger. Flares, of course, are subject to being blown out, and even electric lights can burn out or have the source of power fail. To take care of the possibility that the light source may fail, it is customary to provide light-reflective warning devices in addition to the warning lights themselves. These previous reflector warning devices have generally been of the type having a series of prisms or similar members formed on the surface of a refracting medium, such as plastic, and the prisms are so arranged that light striking the device passes through the refracting medium and is reflected at the rear surface of that medium.

Recently, warning devices have been developed wherein a gaseous conduction electrical discharge tube is intermittently energized by a high voltage power source, the source consisting of a low voltage battery, an interrupter, generally of the magnetic type, and a transformer. A complete combination consisting of battery, circuit interrupter, transformer, and electric discharge tube can be assembled in a very small space, and with proper adjustment, the batteries will have a life of several months. With appropriate modifications, an incandescent lamp can be substituted for the electrical discharge tube, and in either case, the light source is provided with a reflector and a suitable lens to direct the rays of light as desired.

It will be appreciated, however, that such a lens and reflector combination, even though designed to provide a fairly wide spread of the emergent light beams, is very inefficient as a warning reflector, except within a very narrow angle. Even within this angle, if a source of light is directed at the lens and reflector combination, a comparatively small amount of light is reflected back to an observer, and consequently, as heretofore produced, such devices do not operate satisfactorily as reflector-type warning devices.

It has long been known that certain materials fluoresce or give off visible light when subjected to ultraviolet radiation. The color of the fluorescent light is determined by the particular material used, and certain materials will fluoresce for a period of time after the ultraviolet light has ceased. However, these materials are generally opaque or only translucent and interfere with light coming out of or entering into the lens and are activated by light from most any source. Furthermore, most such materials are usually subject to deterioration from exposure.

It is therefore a major object of this invention to provide an improved visible warning and indicating device.

Another object of this invention is to provide such a device that furnishes an improved distribution pattern of light from a normal source, such as an incandescent lamp or an electrical discharge tube within the device, as well as from an external source directed upon the lens, which pattern is less directional and provides a broader beam.

It is a further object of this invention to provide a warning and signalling device of the described type having improved and more efficient light-reflecting characteristics so that the device is more effective when external light shines upon it and makes more effective use of the internal light as well.

It is a further object of this invention to provide a lens that will provide light of one color from the internal source, and light of another color when illuminated by an external source, for example, white light from an incandescent bulb behind the lens, and red light from an external source shining upon the lens.

Still another object of this invention is to provide a lens that, with appropriate modifications, can act to control the light from the normal source to furnish a concentrated or spotlight beam of low or high intensity, or a diffused beam, without accepting the reflected beam of the external or reflected light.

It is a still further object of this invention to provide an improved lens having fluorescent properties provided by a fractional wavelength coating, thereby further increasing the efficiency of the lens.

These and other objects and advantages of this invention will become apparent from the following description of various forms thereof, and from the drawings illustrating those forms, in which:

Figure 1 is a perspective view of a warning sign such as may be used in construction work, with four of the improved warning and indicating lights thereon;

Figure 2 is a cross-sectional view of one of the lights, taken on the line 2—2 of Figure 1 and showing the use of an incandescent bulb as a light source;

Figure 3 is an elevational view of the rear of one of the lenses used with my improved warning and indicating device, taken on the line 3—3 of Figure 2;

Figure 4 is an enlarged fragmentary cross-sectional view of a portion of the lens, taken in the area of Figure 2;

Figure 5 is a cross-sectional view, similar to Figure 2, but indicating the use of an electrical discharge tube instead of an incandescent bulb;

Figure 6 is an enlarged fragmentary cross sectional view of the lens used in connection with the electrical discharge tube, taken in the area 6 of Figure 5;

Figure 7 is a rear elevational view of another form of lens making use of a pair of oppositely directed reflectors;

Figure 8 is a cross-sectional view of the lens taken on the line 8—8 of Figure 7, shown in conjunction with its associated internal light source and specular reflector;

Figure 9 is a rear elevational view of still another form of lens making use of a special refracting portion in addition to the reflector portions; and Figure 10 is a cross-sectional view thereof taken on the line 10—10 of Figure 9.

Referring now to the drawings, and particularly to Figure 1 thereof, the numeral 10 indicates generally a warning sign provided with a plurality of warning and indicating lights 11 that are normally energized by a power and control source 12. It will be appreciated that warning signs and barricades of this general type are customarily used on construction projects, and electric power lines may not be conveniently located or available for energizing the warning lights. Furthermore, and particularly in the case of barricades and signs used in connection with construction projects, the warning or indicating light should be both self-contained and readily portable so that it may be moved from place to place as the need arises. To reduce the average power required by the lights 11, a flashing mechanism is usually incorporated within the power source 12 so that each lamp is lit only a small percentage of the time. In addition to the power saving, a flashing light has the added advantage that it compels attention more readily than a continuously energized light. However, it also increases the opportunities for failure of the warning or indicator light 11, either through failure of its incandescent bulb of similar member, or through failure of the equipment within the power source 12.

It will be appreciated that one of the primary requirements of a warning or indicator light 11 of this general type is that it provides a rather diffused beam that is visible over a rather wide angle. One method of doing this is to provide a lens 13 that refracts and diffuses the light having its origin in the bulb or electrical discharge tube.

For example, in Figure 2, there is shown a warning or indicating light 11 intended primarily for use with an incandescent bulb 14 as its primary source of light. The bulb 14 is mounted in a socket 15 which in turn is connected by suitable wires 16 to a source of power 12, and a reflector 17 is mounted behind the bulb 14 to act in the customary manner. At the front or open end of the reflector 17, the lens 13 is mounted and held in position in any suitable manner, as by a clamping ring 18. As hereinafter pointed out, the exterior of the lens 13 is preferably convex, and the rear or interior face is provided with a multitude of prisms or pyramids or other reflecting members that are molded or otherwise formed in the lens at the time of its manufacture. It has been found that certain of the transparent plastics form a very suitable material for the lens 13, though it is to be understood that under certain conditions, glass or other material may be used if desired. In either case, the prisms 19 act as both reflectors and diffusing members so that light shining upon the exterior face of the lens 13 is reflected by the prisms.

Instead of completely covering the rear of the lens 13, the prisms 19 are formed in a series of concentric rings, such as the rings 20 and 21 shown in Figure 3. While only two such rings are shown, a greater or lesser number may be used if desired. By the same token, while pyramidal prisms 19 have been shown, it is to be recognized that other forms may be used, so long as the desired refraction and reflection is obtained.

Between the concentric rings 20 and 21 is a substantially nondiffusing area 22 that conforms to the general shape of the lens 13, and from which the prisms 19 are omitted. A similar area 23 is provided in the center of the lens, and while these areas may reflect a slight amount of the inwardly directed external light rays, as compared with the rings 20 and 21 they may be considered as non-reflecting.

Warning and indicator lights are usually amber or red, while the light given by an ordinary incandescent globe is more nearly white. To provide the desired final color, the lens 13 is formed of a suitably colored material, thus insuring that the light emitted from the device is of the proper color.

As previously suggested, the prisms 19 act as reflecting members so that external light falling upon the lens 13 passes through these reflecting rings 20 and 21 to the rear surface thereof, where it is reflected and passes out through the rings, being diffused or spread over a slight angle. As the outer surface of the lens 13 is made more convex, the effective angle of the lens becomes greater; that is, if the lens 13 is substantially flat or plane, light coming from a direction substantialy perpendicular to the optical axis of the reflector 17 and lens 13 will not be reflected in an amount sufficient to attract the attention of a person standing approximately at the position of the light source. However, as the lens 13 is made more complex, the visibility of the device is greatly increased, since, among other things, the projected area of the lens visible to the observer and to the external light source is greater.

If the areas 22 and 23 are formed of a transparent plastic as suggested, external light falling upon these areas will pass through the lens 13 without substantial reflection, and the light will hit the mirror 17 and then be reflected outwardly. A certain amount of light will be transmitted through the reflecting rings 20 and 21, and will also strike the mirror 17. Under these circumstances, the light reflected from the mirror 17 acts in the same general manner as light from the incandescent globe 14 that also strikes the mirror. As a result, at least a portion of the light that is reflected from or redirected by the mirror 17 will pass through the reflecting rings 20 and 21 and be diffused thereby.

In Figures 5 and 6, there is indicated another form of warning and indicating device, intended primarily for use with an electrical discharge tube instead of the incandescent globe 14. Electrical discharge tubes have the advantage that they are somewhat more efficient in the conversion of electricity to light, particularly in the production of colored light. Consequently, such tubes are very desirable and offer many advantages for self-contained units having their own power supply. Essentially, the indicating and warning device 11–a, intended for use with an electrical discharge tube, is almost identical to the device 11 intended for use with an incandescent lamp. As indicated in Figure 5, an electrical conduction tube 14–a replaces the incandescent bulb 14, and a reflector 17 directs the light from the tube through a lens 13–a. The latter is held in place by a clamping ring 18, and includes outer and inner reflecting rings 20 and 21, and a non-reflecting ring 22–a therebetween. A central non-reflecting area 23–a is located within the ring 21, the whole lens 13–a being preferably formed of a synthetic plastic or similar material, like the previously described lens 13. Since the tube 14–a is a source of colored, instead of white, light, the non-reflecting members 22–a and 23–a may be colorless, if desired.

In other respects, the operation of the warning and indicating light shown in Figures 5 and 6 is substantially identical with that of the previously described form.

When the internal source of light, the discharge tube 14–a, is not functioning, external light shining upon the device will be reflected from the reflecting rings 20 and 21 by reason of the prisms 19 on the rear surface thereof. Additionally, external light falling upon the non-reflecting areas 22–a and 23–a, will pass through these areas to the reflector 17, from whence they will be redirected outwardly in a diffused pattern and some will even pass through the reflecting rings 20 and 21, all as previously described.

One of the advantages of using an electrical conduction tube 14–a as a source of light is found in the fact that such a source is rich in ultraviolet light, and by the use of appropriate materials for the tube itself, and the lens 13–a, this ultraviolet light may be used to furnish additional visible light.

Many of the plastics transmit ultraviolet light with very little loss, and by forming the tube 14–a of an ultraviolet transmissive material, such as certain specialized types of glass, the ultraviolet light will be transmitted to the exterior of the lens. If a fluorescent material is then applied to the exterior surface of the lens, it will be energized and caused to fluoresce when the tube 14–a is operated. However, a great number of the various fluorescent compounds are opaque or at best translucent, and in addition have the disadvantage that they are subject to weathering so that they shortly lose their effectiveness if used in exposed locations. It has been found that certain compounds of cadmium, calcium, and zinc can be used to provide a very hard coating having fluorescent properties, and are substantially unaffected by exposure to the elements. For example, zinc sulphide, when energized by ultraviolet, will fluoresce with a bluish-purple light and other compounds may be used to provide other colors. The zinc sulphide may be evaporated unto the outer surface of the lens 13–a in accordance with well known procedures and methods, and if the process is properly executed, the result will be thin, uniform coating of considerable hardness that is resistant to the elements.

Furthermore, the coating so formed is substantially transparent, instead of being opaque or translucent, and if the coating is of a thickness equal to some fraction of the wavelength of light falling upon the coating, reflection from the surface from the lens 13–a is considerably reduced, in the same general manner that optical lenses are presently coated, as is also well known in the art.

As a result, the efficiency of the lens 13–a is increased, since more of the light falling upon the forward or outer surface thereof is transmitted through the lens, and in addition, a hard fluorescent coating is provided that insures the conversion of more light, and in addition, more light, from either the normal internal source 14–a, or from an external source, is transmitted through the lens.

It will be appreciated, of course, that this fluorescent coating is not restricted to the lens 13–a of Figure 5, but can in fact be used on any of the lenses shown herein.

In Figures 7 and 8, another form of lens has been illustrated that has additional features that, in addition to rendering it more efficient, provide results not heretofore obtainable.

As indicated in the figures, a lens 30, preferably formed of a transparent plastic, is provided with an outer ring 31 of reflective characteristics, formed by a multitude of prisms or similar reflective shapes 32 upon its rear or inner surface. Adjacent the reflective ring 31 is a non-reflecting ring 33 through which light may pass in either direction without substantial refraction or reflection. Enclosed by the non-reflecting ring 33 is a central reflecting area 34 having a multitude of reflecting elements 32 upon its rear surface. The central reflecting area 34 is substantially aligned with the internal source of light 14, which may be an incandescent bulb, as shown in Figure 2, and the lens 30 is positioned in front of a specular reflector 17 that is located behind the source 14 to direct the light therefrom outwardly through the lens 30.

The central reflecting area 34 is preferably slightly larger than the source 14, and the function of this area is to reflect external light back toward its source. Aligned with the central reflector section 34 is an auxiliary or internal reflector 35 of substantially the same size as the central section, and held thereto by any suitable means such as rivets, cement, etc. A suitable cement is usually the most desirable, since it need not destroy any substantial portion of the reflecting area in the same manner that rivets will. However, since the reflectors 34 and 35 depend for their operation upon the difference between the indices of refraction of plastic and air, the entire space between the reflective areas should not be filled with cement. Consequently, the internal reflector 35 may be conveniently and effectively held to the central reflecting area 34 by cement placed around the periphery of the two sections. It is to be understood, of course, that the internal reflector 35 is preferably formed with a series of reflecting members such as the prisms 32, upon its rear surface, i.e., the surface adjacent the central reflecting portion 34.

The purpose of the internal reflector 35 is two-fold. First, as a reflector aligned with the light source 14, it acts to reflect light directed outwardly from that source and which would otherwise pass directly through the lens 30. However, the presence of the internal reflector 35 insures that this light first strikes the internal reflector 35 and then is reflected inwardly, toward the specular reflector 17, in a direction substantially parallel to its original path. Upon striking the specular reflector 17, the light is again reflected, this time outwardly, in a direction substantially parallel to the optical axis of the lens 30 and reflector 17. The foregoing, of course, assumes that the specular reflector 17 is substantially parabolic, and if some other form is used, the light will be reflected outwardly in some slightly different direction, in accordance with the usual reflection pattern of the specular reflector 17. It is to be noted that the beam just described is reflected from the internal reflector 35 in such a manner that the reflected beam passes immediately adjacent the original source, such as filament of the bulb 14, and consequently as far as the specular reflector is concerned, may be considered as originating at the filament. It is well known that light from a source is much more easily and accurately controlled if it is first reflected from a specular reflector, such as the reflector 17, instead of passing directly through a lens, such as the lens 30. By the use of such a reflector, the amount of "spill" light is greatly reduced. Light from the source 14 that is reflected first by the internal reflector 35 and then by the specular reflector 17 thus follows a path such as that shown in Figure 8 and designated by the letter C.

The second function of the internal reflector 35 is to further increase and improve the efficiency of the reflection of external light falling upon the lens 30. Thus, light travelling parallel to the optical axis of the lens 30 and specular reflector 17 as indicated by the path D, and passing through the non-reflecting portion 33 of the lens, first strikes the specular reflector, is reflected to the internal reflector 35, is reflected back therefrom in a direction substantially parallel to the original path, and is then again reflected by the specular reflector out through the non-reflecting section 33. Other light rays, parallel to the optical axis, and striking the outer reflecting portion 31 and the central reflecting portion 34, are reflected back, by the reflecting prisms 32, along paths substantially parallel to their original path. However, the light that enters the non-reflecting portion 33 and is then reflected by the specular reflector 17, would, without the inner reflector 35, pass out through the lens 30, either by passing through the central reflecting area 34, where it would be greatly diffused, or out through the non-reflecting area 33 on the opposite side of the optical axis at an angle to that axis where its effectiveness would be greatly diminished.

Additionally, light rays at an angle to the optical axis, such as those indicated by the letters B and E of Figure 8, are likewise passed through the non-reflecting portion 33 to strike the specular mirror 17 and then the inner reflector 35 to be reflected back along paths parallel to their original paths, so that light is directed back toward its source. As a result, the efficient use of the device as a reflector is not limited to those instances where external light is directed upon the lens in a direction substantially parallel to the optical axis. Consequently, light from the headlights of an automobile, for example, striking the lens 30 at an angle, will be reflected back to the operator of the vehicle with sufficient intensity to be readily visible, even though the light source 14, has, for some reason failed. At the same time, light from the headlights that strike the reflecting portions 31 and 34 will be reflected back toward the operator of the vehicle in the general manner indicated by the path of the ray A of Figure 8.

With this form of the device, it is also possible to provide a beam of light, originated by the source 14, of one color, while light reflected from an exterior source is primarily that of another color. Thus, if the exterior ring 31 is red, as is the central reflecting portion 34, while the internal reflector 35 is colorless, as is the non-reflecting portion 33, the major portion of light emitted by the source 14 will be reflected from the colorless internal reflector 35, and, after being reflected from the specular reflector 17, will pass out the colorless, non-reflecting portion 33. A comparatively small amount of light, either directly from the source 14, or reflected therefrom by the specular reflector 17, will be emitted through the reflecting portion 31, or if desired, the reflecting ring 31 may be placed outside the boundaries of the specular reflector 17. In either event, the light emitted from the lens 30 will be principally that of the color of the light emitted by the source 14.

However, when the source 14 is not illuminated, and external light falls upon the lens 30, the reflecting portion 31, as well as the central reflector 34, both reflect light which is colored by reason of its transmission through the portions of the lens. Thus, if the reflecting portions 31 and 34 are colored red, and external light, which is white, is allowed to fall upon the lens 30, the light reflected from the portions 31 and 34 will likewise be red.

Light that passes through the non-reflecting portion 33 and strikes the specular reflector 17, will be reflected to the internal reflector 35, which is colorless, and will then be reflected back along paths parallel to the original paths. The effect of this operation is to dilute the color of the light reflected by the reflecting portions 31 and 34, so that if these are colored red, and substantially white light is shown upon the lens, the net result, so far as visual observation is concerned, is a certain lightening of the shade of the reflected light, though the distinctive red color is predominant. So far as is known, no previous lens or lens and reflector combination has provided such a result.

In Figures 9 and 10, still another form of the invention is illustrated. In this form, a lens 40 is provided with an outer reflecting ring 41 having reflecting prisms or other suitable members 42 on the rear surface thereof. Located inwardly from the outer reflecting ring 41 is a non-reflecting portion 43 that, while preferably curved as illustrated in Figure 9, is plano, i.e., formed with parallel inner and outer surfaces so that there is no change in direction of light passing through this portion.

Radially inwardly from the non-reflecting portion 43 is a reflecting portion 44 in the form of an annular ring having prisms 42 or other suitable members upon its rear surface to reflect light falling upon the outer surfaces thereof. Finally, surrounded by the inner reflecting ring 44, is a central non-reflecting portion 45 having an inner surface 46 so that the portion 45 acts as a convex lens. A light source 14 is placed on the optical axis of the lens 40, and a specular reflector 17 directs the light from the source through the lens. Preferably, the specular reflector is parabolic in shape, with the filament or other light-emitting portion of the source 14 located at the focus of the specular reflector. The central non-reflecting portion 45 acts, as previously mentioned, as a lens, and the focal point thereof is likewise located at the filament or other light-emitting member of the source 14.

The operation of this form of this device, insofar as the reflecting portions 41 and 44 are concerned, is essentially the same as that of the forms shown in Figures 2 to 6, but the operation of the non-reflecting portions 43 and 45 is somewhat different. Thus, light parallel to the optical axis that passes through the outer non-reflecting portion 43, strikes the parabolic reflector 17 and is focused at the filament of the source 14, and passes on to emerge as any other light from that filament. That portion of the light from the filament, either directed to the filament or emitted therefrom, that falls upon the rear surface 46 of the central non-reflecting portion 45, is focused by the lens action of that portion and emerges therefrom as light rays travelling parallel to the optical axis.

In a similar manner, parallel light rays, travelling along the optical axis, and striking the central non-reflecting portion 45, are brought to focus at the filament of the source 14, and continue therebeyond to strike the parabolic reflector 17 from whence they are reflected in the same manner as light emitted by the filament.

When the source 14 is operating, the major portion of the light 14 emitted therefrom is directed to the specular reflector 17 from whence it is directed outwardly through the reflecting portions 41 and 44 and the non-reflecting 43. Light that passes through the reflecting portions 41 and 44 is diffused thereby, but the light passing through the non-reflecting portion 43 from the specular reflector 17 continues in a direction parallel to the optical axis. The portion of the light from the source 14 that strikes the surface 46 of the central portion 45 is refracted by the action of the lens to emerge as a bundle of parallel rays travelling along the optical axis.

This form of the invention has more directional properties than the form shown in Figures 7 and 8, as well as being somewhat more directional than the forms shown in Figures 2 through 6. Each of the lenses has its own particular field of use, and the selection of any particular lens will be governed largely by the use to which it is to be placed.

From the foregoing, it will be seen that there has been provided a warning and indicating device that is fully capable of securing the advantages and achieving the objects heretofore set forth. It will be appreciated that modifications may be made in the device, such as changes in the relative position of the reflecting and non-reflecting members, but this change and others similar to it will occur to those skilled in the art. Consequently, while several forms of the invention have been shown and described, the patent is not to be restricted to the particular form or arrangement of parts herein described and shown, except as limited by the claims.

We claim:

1. A lens of the type described which includes: a first annular section whose rear surface is covered with a series of light-reflecting members, whereby substantially all of the light falling upon the front surface of said section and transmitted to the rear surface is reflected thereby; a second annular section, wider than one of said light-reflecting members, radially inward from said first annular section, formed to transmit light without substantial reflection; a central reflector section whose rear surface is covered with a series of light-reflecting members, whereby substantially all of the light falling upon the front surface of said section and transmitted to the rear surface is reflected thereby, said light-reflecting members of said first annular section and of said central reflector section acting to diffuse light entering the rear surfaces of said sections and passing toward the front surfaces thereof; and an inner reflector centrally located with respect to the optical axis of said lens and with respect to said central reflector section and adapted to reflect outwardly directed light, adjacent said optical axis, back toward its apparent source.

2. A lens intended for use with a reflector and a light source and including: a first annular section adjacent the edge of said lens, having a rear surface covered with a series of light-reflecting pyramidal members acting to reflect substantially all of the light falling upon the front surface of said section and transmitted to said rear surface; a second annular section concentric with and adjacent to said first annular section and radially inward therefrom, having minimum reflection characteristics for light passing in either direction therethrough; a central reflecting section surrounded by said second annular section and having its rear surface covered with a series of light-reflecting pyramidal members acting to reflect substantially all of the light falling upon the front surface of said section and transmitted to said rear surface, said pyramidal members of said first annular section and said central reflecting section acting to diffuse light directed outwardly from said reflector and light source; and an inner reflecting member centrally located with respect to the optical axis of said lens and generally parallel with the plane of said lens, having a reflecting surface away from said light source and adjacent said rear surface of said central reflecting member, said reflecting surface being covered with a series of light-reflecting pyramidal members, adapted to reflect outwardly directed light from said reflector and said light source, back toward its apparent source.

3. A lens as described in claim 2 in which the outer surface thereof is covered with a hard, transparent, weather-resistant fluorescent coating whose thickness is a fractional portion of the wave length of most visible light, whereby reflection from the outer surface of said lens is reduced.

4. A lens intended for use with a reflector and a light source and including: a first annular section adjacent the edge of said lens, having a rear surface covered with a series of abutting light-reflecting pyramidal members acting to reflect substantially all of the light falling upon the front surface of said section and transmitted to said rear surface; a second annular section concentric with and adjacent to said first annular section and radially inward therefrom, having minimum reflection characteristics for light passing in either direction therethrough; a central reflecting section surrounded by said second annular section and having its rear surface covered with a series of abutting light-reflecting pyramidal members acting to reflect substantially all of the light falling upon the front surface of said section and transmitted to said rear surface, said pyramidal members of said first annular section and said central reflecting section acting to diffuse light directed outwardly from said reflector and light source; and an inner reflecting member centrally located with respect to the optical axis of said lens and substantially aligned with said central reflecting section and generally parallel with the plane of said lens, adapted to reflect outwardly directed light from said light source back toward said light source for further reflection by said reflector and to reflect outwardly directed light from said reflector back to the same for further reflection thereby to its source.

5. A lens intended for use with a reflector and a light source and including: a first annular section of a first color, adjacent the edge of said lens, having a rear surface covered with a series of abutting light-reflecting pyramidal members acting to reflect substantially all of the light of said first color falling upon the front surface of said section and transmitted to said rear surface; a second annular section of another color concentric with and adjacent to said first annular section and radially inward therefrom, having minimum reflection characteristics for light passing in either direction therethrough; a central reflecting section of said first color, surrounded by said second annular section and having its rear surface covered with a series of abutting light reflecting pyramidal members acting to reflect substantially all of the light of said first color falling upon the front surface of said section and transmitted to said rear surface, said pyramidal members of said first annular section and said central reflecting section acting to diffuse light directed outwardly from said reflector and light source; and an inner reflecting member of said other color, centrally located with respect to the optical axis of said lens and substantially aligned with said central reflecting section and generally parallel with the plane of said lens, adapted to reflect outwardly directed light of said other color from said reflector and said light source, back toward its apparent source.

6. A lens as described in claim 5 in which the outer surface thereof is covered with a hard, transparent, weather-resistant, fluorescent coating whose thickness is a fractional portion of the wavelength of most visible light, whereby reflection from the outer surface of said lens is reduced.

7. A lens intended for use with a reflector and a light source and including: a first annular section of a first color, adjacent the edge of said lens, having a rear surface covered with a series of light-reflecting pyramidal members acting to reflect substantially all of the light of said first color falling upon the front surface of said section and transmitted to said rear surface; a second annular section of another color concentric with and adjacent to said first annular section and radially inward therefrom, said second annular section having a width substantially wider than one of said light reflecting members and having minimum reflection characteristics for light passing in either direction therethrough; a central reflecting section of said first color, surrounded by said second annular section and having its rear surface covered with a series of light reflecting pyramidal members acting to reflect substantially all of the light of said first color falling upon the front surface of said section and transmitted to said rear surface, said pyramidal members of said first annular section and said central reflecting section acting to diffuse light directed outwardly from said reflector and light source; and an inner reflecting member of said other color, centrally located with respect to the optical axis of said lens, substantially aligned with said central reflecting section, and generally parallel with the plane of said lens, adapted to reflect outwardly directed light of said other color back toward said light source for further reflection by said reflector, and to reflect outwardly directed light of said other color from said reflector back to the same for further reflection thereby to its source.

8. A lens as described in claim 7 in which the outer surface thereof is covered with a hard transparent, fluorescent coating whose thickness is a fractional portion of the wavelength of most visible light, whereby reflection from the outer surface of said lens is reduced.

References Cited in the file of this patent

UNITED STATES PATENTS

| | | |
|---|---|---|
| 1,588,816 | Sisson | June 15, 1926 |
| 1,675,431 | Sharp | July 3, 1928 |
| 1,840,098 | Hobson | Jan. 5, 1932 |
| 1,847,134 | Nikonow | Mar. 1, 1932 |
| 2,012,933 | Davidson | Aug. 27, 1935 |
| 2,220,861 | Blodgett | Nov. 5, 1940 |
| 2,459,693 | Gordon | Jan. 8, 1949 |
| 2,680,205 | Burton | June 1, 1954 |
| 2,798,147 | Orsatti | July 2, 1957 |

FOREIGN PATENTS

| | | |
|---|---|---|
| 380,676 | Great Britain | Sept. 22, 1932 |

UNITED STATES PATENT OFFICE
CERTIFICATE OF CORRECTION

Patent No. 2,981,827                  April 25, 1961

Ernest R. Orsatti et al.

It is hereby certified that error appears in the above numbered patent requiring correction and that the said Letters Patent should read as corrected below.

Column 8, line 60 and 61, for "centrol" read -- central --; column 9, line 52, for "abtuting" read -- abutting --; column 10, line 47, after "hard" insert a comma.

Signed and sealed this 24th day of October 1961.

(SEAL)
Attest:

ERNEST W. SWIDER
Attesting Officer

DAVID L. LADD
Commissioner of Patents
USCOMM-DC